United States Patent [19]

Cuidard et al.

[11] Patent Number: 4,579,895

[45] Date of Patent: Apr. 1, 1986

[54] POLY-PARA-PHENYLENETEREPHTHALAMIDE COMPOSITIONS, THEIR PREPARATION AND A PROCESS FOR THE PRODUCTION OF FIBRES FROM THESE COMPOUNDS

[75] Inventors: Robert Cuidard; Bruno Giroud-Abel, both of Ecully; Vincent Rochina, L'Arbresle, all of France

[73] Assignee: Rhone-Poulenc Textile, Paris, France

[21] Appl. No.: 737,587

[22] Filed: May 24, 1985

Related U.S. Application Data

[63] Continuation of Ser. No. 578,596, Feb. 10, 1984, abandoned, which is a continuation of Ser. No. 333,020, Dec. 21, 1981, abandoned.

[30] Foreign Application Priority Data

Dec. 22, 1980 [FR] France ................................ 80 27412

[51] Int. Cl.$^4$ ................................................ C08K 5/34
[52] U.S. Cl. .................................................... 524/104
[58] Field of Search ........................................ 524/104

[56] References Cited

U.S. PATENT DOCUMENTS

| | | | |
|---|---|---|---|
| 3,063,966 | 11/1962 | Kwolek et al. | 528/208 |
| 3,068,188 | 12/1962 | Beste et al. | 524/104 |
| 3,240,760 | 3/1966 | Preston et al. | 524/104 |
| 3,671,542 | 6/1972 | Kwolek | 264/210.8 |
| 4,250,073 | 2/1981 | Tamura et al. | 524/104 |

FOREIGN PATENT DOCUMENTS

| | | | |
|---|---|---|---|
| 2355864 | 6/1977 | France . | |
| 0015747 | 12/1974 | Japan | 524/104 |
| 0046118 | 4/1977 | Japan | 524/104 |

OTHER PUBLICATIONS

Chemical Abstracts, vol. 88, 1978, p. 16.

*Primary Examiner*—Joseph L. Schofer
*Assistant Examiner*—N. Sarofim
*Attorney, Agent, or Firm*—Stevens, Davis, Miller & Mosher

[57] ABSTRACT

The invention relates to a homogeneous fluid composition which can be shaped, consisting of N-methylpyrrolidone-2, poly-para-phenyleneterephthalamide in an amount of 5 to 7% by weight, relative to the weight of the composition, calcium chloride or lithium chloride, and a tertiary amine with a pK $H_2O$ equal to at most 6.60, and also to the process for its production. The composition can be shaped directly to form filaments, fibres, films or fibrids which can be used, for example, in the textile industry.

7 Claims, No Drawings

POLY-PARA-PHENYLENETEREPHTHALAMIDE COMPOSITIONS, THEIR PREPARATION AND A PROCESS FOR THE PRODUCTION OF FIBRES FROM THESE COMPOUNDS

This application is a continuation of application Ser. No. 578,596, filed Feb. 10, 1984, now abandoned, which in turn is a continuation of application Ser. No. 333,020 filed Dec. 21, 1981, now abandoned.

The invention relates to new compositions based on poly-para-phenyleneterephthalamide (PPD-T) and N-methylpyrrolidone-2 (NMP), which can be shaped directly to form yarns, fibres, films or fibrids.

The invention also relates to the process for their preparation and to a very simplified process for the production of PPD-T fibres.

It is known from French Pat. Nos. 1,599,980 and 2,010,753 to prepare optically anisotropic compositions of aromatic polyamides in liquids which can be sulphuric acid, hydrofluoric acid or various amides and ureas, such as dimethylacetamide (DMAC), N-methylpyrrolidone-2 (NMP), hexamethylphosphotriamide (HMPT) and tetramethylurea (TMU), the latter liquids optionally being mixed with salts such as lithium chloride or calcium chloride, and to spin these compositions. However, the polycondensation of PPD-T is only carried out in pure HMPT or an HMPT/NMP mixture containing at least 45% of HMPT, and the PPD-T obtained is generally separated from the reaction medium and redissolved in sulphuric acid, and the sulphuric acid composition is spun. It has indeed been envisaged to spin directly the anisotropic PPD-T composition obtained from the polycondensation, without separation of the polymer, but in that case the compositions always contain a high proportion of HMPT. Now, the recently discovered carcinogenic properties of HMPT prohibit its use in industry. Certain aromatic polymers are indeed subjected to polycondensation in less dangerous solvent mixtures, such as DMAC to which lithium chloride has been added, and the compositions obtained are spun directly, but these are polymers which are more soluble than PPD-T, such as poly(chloro-p-phenyleneterephthalamide).

Likewise, according to French Patent Application No. 2,134,582, published on Dec. 8, 72, for the production of high-viscosity PPD-T, only an HMPT/NMP mixture is used and the PPD-T is then separated off by stirring with water and dissolved in sulphuric acid, and the optically anisotropic sulphuric acid composition thus obtained is spun.

Furthermore, certain texts describe the preparation of aromatic polyamides in a mixture consisting of a substituted amide, such as dimethylacetamide or N-methylpyrrolidone-2, and of calcium chloride or sodium chloride, optionally in the presence of a tertiary base. However, these texts generally envisage the use of very wide ranges of the various constituents of the reaction medium, as regards both their nature and their proportion, with the result that none of the examples simultaneously using NMP, calcium chloride or lithium chloride, and pyridine, methylpyridine or dimethyl- or diethyl-aniline led to particular solutions. This is the case of French Patent Application No. 2,301,548, published on Sept. 17, 76, and French Patent Application No. 2,355,864, published on Jan. 20, 78, and also of Belgian Pat. No. 851,965, published on Sept. 01, 77, and Japanese Application No. 77/124,099. In all these texts, the PPD-T obtained is subsequently separated from the composition, washed, dried and then dissolved in concentrated sulphuric acid, or one of its derivatives, for the subsequent spinning.

Finally, Japanese Application Nos. 79/018,922 and 80/022,052, published respectively on Feb. 13, 79 and Feb. 13, 80, describe the preparation of aromatic copolyamides in dimethylacetamide or N-methylpyrrolidone and the direct spinning of the solution obtained. However, it is known that these copolymers, which contain ether linkages and, if appropriate, chlorine substituents, are much more soluble than substantially pure PPD-T.

The expression "substantially pure PPD-T" is understood as meaning polymers containing at least 95% of para-phenylene radicals and less than 5% of other rigid or flexible radicals such as 1,5- or 2,6-naphthylene, 2,5-pyridylene, meta-phenylene, 1,8- or 2,7-naphthylene, butylene or the like.

On the other hand, to the knowledge of the Applicant Company, it has never been possible hitherto to obtain directly spinnable PPD-T solutions by polycondensation, without separation of the polymer and without the solutions containing HMPT.

The present invention relates to a homogeneous fluid composition which can be shaped, consisting of N-methylpyrrolidone-2, substantially pure PPD-T in an amount of 5 to 7% by weight of polymer, relative to the weight of the composition, calcium chloride or lithium chloride, and a tertiary amine with a pK $H_2O$ which is less than or equal to 6.50, the ratio of the number of mols of these last two products to the number of para-phenyleneterephthalamide units being 0.75 to 2 in the case of the calcium chloride or lithium chloride and 1 to 3 in the case of the tertiary amine.

The invention also relates to a process for the production of the above composition, in which process a substantially stoichiometric amount of terephthaloyl chloride is reacted, continuously or batchwise, with a solution of para-phenylenediamine, in an amount such that it is possible to form a composition containing at least 5% by weight of para-phenyleneterephthalamide, in a homogeneous mixture of N-methylpyrrolidone, calcium chloride or lithium chloride, and a tertiary amine with a pK $H_2O$ which is less than or equal to 6.60, the molar ratio of each of these last two products to the para-phenylenediamine being 0.75 to 2 in the case of the calcium chloride or lithium chloride and 1 to 3 in the case of the tertiary amine, without however exceeding the solubility limit of the calcium chloride or lithium chloride, and a further amount of the same tertiary amine and/or of N-methylpyrrolidone-2, which can contain calcium chloride or lithium chloride, is added, if appropriate, so that the final composition contains 5 to 7% by weight of poly-paraphenyleneterephthalamide and at the same time 0.75 to 2 mols of calcium chloride or lithium chloride and preferably 2 to 3 mols of tertiary amine per para-phenyleneterephthalamide unit.

The invention also relates to a simplified process for the production of poly-para-phenyleneterephthalamide filaments, fibres, films or fibrids having good mechanical properties, by extrusion or casting of the above composition at a temperature which is preferably below 25° C., into a water-based coagulating bath at a temperature which is preferably below 35° C., washing with water and drying in air.

Finally, it relates to the filaments, fibres, films or fibrids obtained by this process.

The tertiary amine used according to the present invention must have a pK $H_2O$ or $pK_a$ equal to at most 6.60. Examples which may be mentioned of tertiary amines which can be used are pyridine (pK $H_2O$: 5.25), quinoline (4.90), isoquinoline (5.40), 2-methylpyridine (6.20), dimethylaniline (5.15) and diethylaniline (6.60) (see Handbook of Chemistry and Physics, 49th Edition). If an amine of higher pK $H_2O$ is used, a sparingly soluble complex generally forms between the tertiary amine and the terephthaloyl chloride (T-COCl), totally or partially preventing the T-COCl from reacting with the para-phenylenediamine (PPD). It would be possible to overcome this disadvantage by using a more dilute medium, but in that case the composition obtained is of too low a concentration to be spun directly in an economic manner. Furthermore, the inherent viscosity of the polymer would be low and this would lead to filaments and other shaped articles having poor properties.

Likewise, in order to obtain a good composition which can be shaped directly under good conditions, the amount of tertiary amine in the composition must be such that the A/P ratio of the number of mols of the said amine to the number of para-phenyleneterephthalamide units, that is to say of chemical units

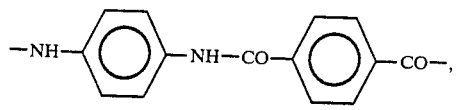

is between 1 and 3 and preferably between 2 and 3. This ratio is calculated by assuming a degree of polycondensation of 100%, based on the amount of para-phenylenediamine introduced.

The use of larger amounts of tertiary base also favours the formation of the complex between the tertiary amine and the T-COCl, greatly reducing the reaction rate.

It is possible to prepare a composition by using an amount of tertiary amine which leads to a ratio A/P of less than 2 but of at least 1, and then, if appropriate, to add a further amount of tertiary amine to the mixture obtained, in order to bring the ratio A/P to at least 2 in the final composition to be shaped.

The ratio C/P of the number of mols of $CaCl_2$ or LiCl to the number of para-phenyleneterephthalamide units must be between 0.75 and 2. It is also calculated by assuming a degree of polycondensation of 100% and is based on the amount of para-phenylenediamine introduced. However, it depends on the proportions of the other compounds in the reaction medium. In fact, if the reaction is carried out with a high concentration of PPD, it is sometimes impossible to reach a ratio C/P of 2 because the level of chloride would then exceed its solubility limit in the medium, and this must be excluded because it is necessary to work in a homogeneous medium.

The fluid composition which can be shaped, according to the present invention, must contain an amount of PPD-T of between 5 and 7% by weight, relative to the total weight of the composition. A polymer concentration of less than 5% would lead to excessively fluid compositions which are difficult to shape under good conditions on an industrial scale. A polymer concentration of more than 7%, on the other hand, would lead to excessively viscous compositions which are also difficult to shape on an industrial scale. However, it may be preferred, in certain cases, to prepare the composition by using amounts of T-COCl and PPD leading to a polymer concentration of more than 7%, and then to dilute it by means of NMP alone or NMP to which a tertiary amine and/or calcium chloride or lithium chloride have been added, in order to bring the concentration of polymer in the final composition back to between 5 and 7%. In this case, however, it is appropriate not to use excessively large amounts of calcium chloride or lithium chloride, which would not be entirely dissolved in the reaction medium.

To obtain the composition which can be shaped, according to the present invention, the para-phenylenediamine is dissolved in a mixture of NMP, calcium chloride or lithium chloride and a tertiary base, if appropriate with gentle heating to about 30°–40° C., or even 60°0 C. or above, in order to facilitate dissolution. The solution is then cooled to a temperature which does not generally exceed ambient temperature but is preferably lower, such as 0° C. or even below. The proportion of water in the PPD solution must be as low as possible, generally very much less than 1,000 ppm, preferably less than 500 or, more preferably, less than 300 ppm, for example between 0 and 250 ppm. To do this, anhydrous products or products which have been dried beforehand, for example in vacuo in the case of the chlorides or by distillation in the case of the NMP and the tertiary amine, are used. It is also possible to top a mixture of crude NMP and technical-grade calcium chloride or lithium chloride by distillation, and to distil the tertiary amine separately.

The polycondensation reaction can be carried out batchwise. To do this, the T-COCl is added, whilst stirring vigorously, to the diamine solution placed in a cooled container, the T-COCl being added all at once or, preferably, in a controlled manner, that is to say either in successive small portions or continuously, in order to avoid a large temperature increase due to the exothermicity of the reaction. It is also possible to carry out the polycondensation continuously by simultaneously injecting the PPD solution and the molten T-COCl into a mixer, this process being preferable by far for economic and technical reasons, for example the better uniformity of the polymer obtained. To do this, the temperature of the T-COCl must be sufficient for it to be in the liquid state, but it must not be too high so as not to heat the reaction mixture excessively or risk degrading it. A temperature between 85° and 120° C. will therefore preferably be chosen.

As the initial micromixing of the T-COCl with the diamine solution must be instantaneous or virtually instantaneous, it is appropriate to use an extremely efficient mixing apparatus fitted with very precise devices for injecting the reactants. For example, is is possible to use a device of the type consisting of a rotor rotating at high speed in a fixed container, leaving a small clearance for the passage of the material between the rotor and the stator, in order to ensure very efficient and rapid mixing during the very first seconds of the reaction.

After this first part of the equipment, which does not need to be very bulky in order to ensure a residence time of the order of a second, the material can pass into a second part in which the malaxation of the material is continued, but more slowly, for example in equipment comprising one or more screws.

It is also possible to use equipment other than that described above, provided it is efficient enough to ensure virtually instantaneous, initial micromixing of the reactants.

Of course, the amounts of PPD and T-COCl used must be substantially stoichiometric.

After the polycondensation reaction, a further amount of the same tertiary amine as that used, and/or of NMP, which can contain calcium chloride or lithium chloride, can be added, if appropriate, so that the final composition contains 5 to 7% by weight of PPD-T and at the same time 2 to 3 mols of tertiary amine and 0.75 to 2 mols of calcium chloride or lithium chloride per para-phenyleneterephthalamide unit.

As stated above, it is possible to prepare a PPD-T containing less than 5% of radicals other than para-phenylene, without going outside the scope of the invention. To do this, it suffices to add a small amount of another diamine and/or of another diacid dichloride to the PPD or the T-COCl, whilst having regard, however, for the stoichiometry between the diamines and the dichlorides.

The composition obtained is homogeneous and fluid. It has an optical anisotropy permanent when stored in the absence of moisture for at least several hours, but more generally several months, at a temperature of at least 0° C., but frequently also at ambient temperature. This anisotropy generally increases with time. This type of composition of substantially pure PPD-T, such as obtained at the end of the polycondensation, can be used directly for shaping to filaments, fibres, films or fibrids, in contrast to the PPD-T compositions without HMPT, obtained hitherto, from which it was necessary to separate the polymer first and then redissolve it in sulphuric acid for subsequent shaping. The composition according to the present invention thus makes the conversion of the PPD-T much simpler and more economic than the processes known hitherto, not only through the omission of intermediate treatment stages, namely separation and redissolution of the polymer, but also through the use of a solvent which is easier to handle and less dangerous than sulphuric acid or HMPT.

The present invention thus also relates to a simplified process for the production of PPD-T filaments, fibres, films or fibrids by extrusion or casting of the composition according to the invention, at a temperature which is preferably below 25° C., that is to say at ambient temperature or a lower temperature, for example at about 9°-10° C. The extrusion is carried out into an aqueous bath which can be either pure water, or an aqueous solution of calcium chloride or lithium chloride, or a mixture of NMP, water and calcium chloride or lithium chloride. For these last two baths, it is preferred to use the same chloride as that contained in the composition to be shaped.

The temperature of the coagulating bath can vary within wide limits, but it is not generally advantageous, in particular for economic reasons, to exceed 35° C. or to drop below 0° C. The articles obtained, namely filaments, fibres, films or fibrids, are then washed with water, preferably at ordinary temperature, and dried in air at room temperature or higher. They have good mechanical properties. They also can be stretched and/or heat treated what still increases their mechanical properties.

The following examples, in which the percentages are by weight unless stated otherwise, are given by way of indication in order to illustrate the invention without in any way limiting it.

In these examples, the inherent viscosity (IV) of the polymer is measured at 25° C. on a solution containing 0.5 g of polymer in 100 ml of 100% strength sulphuric acid. It is expressed in $dl.g^{-1}$.

The calcium chloride used is $CaCl_2.2H_2O$ treated at 200°-250° C. in vacuo for 24 to 48 hours.

The PPD and T-COCl used are 99.4% pure unless stated otherwise.

The spinneret stretching ratio Ss is the ratio of the speed at which the yarn leaves the coagulating bath to the average extrusion speed. If this ratio is greater than 1, this corresponds to true stretching, whilst a ratio of less than 1 corresponds to contraction.

The mechanical properties of the filaments are measured on individual 5 cm filaments using an Instron tensile strength tester with 10 measurements per test.

EXAMPLE 1

54 g (0.5 mol) of para-phenylenediamine are introduced into a 2 liter reactor, and a ternary mixture of:

| | |
|---|---|
| NMP | 1,175.6 g |
| anhydrous $CaCl_2$ | 78.7 g |
| pyridine | 79.1 g | containing 310 ppm of water, is then added.

The mixture is heated for 30 minutes at about 35° C. in order to facilitate the dissolution of the diamine, and then cooled to 0° C. by means of a brine bath. After 45 minutes, 102 g of T-COCl flakes are added all at once, whilst stirring vigorously, the reactor being kept in the brine bath. After 4 minutes, the stirring is slowed down and the composition is kept at 0° C. for 15 minutes, and the composition is then allowed to return to ambient temperature, whilst stirring gently.

This gives a composition containing 8.58% of PPD-T, which is kept for several hours at ambient temperature, in an anhydrous atmosphere.

It is diluted by adding a 6.28% strength solution of $CaCl_2$ in NMP, whilst stirring slowly, until a composition having a polymer concentration of 5.9% is obtained which has a ratio C/P of 2 and a ratio A/P also of 2. It is very viscous and homogeneous and shows optical anisotropy under a microscope between the polariser and analyser. The inherent viscosity of the polymer is 3.65.

After storage for one month at ambient temperature, the anisotropic composition, which is fluid at ambient temperature (IV of the polymer: 3.72), is extruded at 20° C., at a rate of 3.15 cm³/minute, through a spinneret possessing 100 orifices of diameter 0.06 mm, which is immersed in a water bath at 20° C. The filaments obtained at 14 m/minute (Ss: 1.26) are washed with water and dried in air at ordinary temperature. They possess the following characteristics:

| | |
|---|---|
| gauge per filament | 1.62 dtex |
| tensile strength | 61 cN/tex |
| elongation | 6.6% |
| initial modulus of elasticity | 1,920 cN/tex |

EXAMPLE 2

The reaction is carried out as in Example 1, but in a 0.5 liter reactor and with the following amounts:

| PPD | 7.57 g |
|---|---|
| NMP | 163.96 |
| anhydrous CaCl₂ | 11.65 |
| distilled pyridine | 11.08 |

The proportion of water in the ternary mixture is 230 ppm.

After dissolution of the diamine and cooling to 0° C., 14.30 g of T-COCl are added. After 15 minutes, the cooling bath is removed. After one hour, the composition is diluted as in Example 1 until a [PPD-T] polymer concentration of 6% is obtained. The homogeneous composition, which exhibits pronounced anisotropy in the static state, under a microscope, is precipitated in water at ordinary temperature and gives fibrils.

Characteristics of the composition:

| [PPD-T] | 6% |
|---|---|
| ratio C/P | 2 |
| ratio A/P | 2 |
| IV of the polymer | 4.55 |

EXAMPLE 3

The reaction is carried out as in Example 2, but with

| PPD | 5.4 grams |
|---|---|
| NMP | 166.75 grams |
| anhydrous CaCl₂ | 8.32 grams |
| pyridine | 7.91 grams |

After dilution with the solution of CaCl₂ in NMP, a homogeneous fluid composition is obtained which is anisotropic in the static state, under a microscope, in polarised light, and which possesses the following characteristics:

| [PPD-T] | 5% |
|---|---|
| ratio C/P | 1.95 |
| ratio A/P | 2 |
| IV of the polymer | 3.40 |

After storage for one month standing in an anhydrous medium and at ambient temperature, the composition has not changed.

This composition is cast onto glass plates at ambient temperature, to a thickness of 0.15 mm, and coagulated in three different ways:

A—in pure water.
B—in a 36% strength aqueous solution of CaCl₂.
C—in a 50/50 by volume mixture of NMP and a 36% strength aqueous solution of CaCl₂.

The films obtained are all washed with water and dried in air at ambient temperature.

Only film A tends to form long fibrils under tension. Films B and C have a good appearance.

EXAMPLES 4 TO 8

Example 1 is repeated, but the T-COCl is added in successive small portions in Examples 5 to 8, whereas it is added all at once in Example 4. The pyridine is replaced by quinoline in Examples 7 and 8. The operating conditions and the results are summarised in Table I below, in which the deviation from stoichiometry represents the excess (+) or the deficiency (−) of T-COCl, relative to the theoretical stoichiometry expressed by weight. The composition of Example 5 was not diluted.

The compositions obtained are all homogeneous and anisotropic on examination in the static state, under a microscope, in polarised light.

They are spun, as in Example 1, into a water bath. The other spinning conditions are given in Table I below, together with the characteristics of the filaments obtained.

EXAMPLES 9 TO 14

The reaction is carried out as in Example 1, except in the case of Examples 13 and 14, in which the reaction is carried out on greater amounts in a 45 liter reactor.

The other operating conditions and the results are given in Table II below.

TABLE I

| Example | 4 | 5 | 6 | 7 | | 8 | |
|---|---|---|---|---|---|---|---|
| Water in diamine solution, in ppm | 225 | 200 | 191 | 192 | | 138 | |
| Addition time of the T-COCl | 30 seconds | 1 hour 23 minutes | 15 minutes | 17 minutes | | 15 minutes | |
| Temperature of mixture, °C. | 0–27 | 20–25 | 20–25 | 20–25 | | 20–25 | |
| Deviation from stoichiometry | +0.6 | −1 | −1.5 | −1.5 | | −1.5 | |
| COMPOSITION AFTER POLYCONDENSATION: | | | | | | | |
| [PPL-T], % | 6 | 6 | 7 | ≈7 | | 5 | |
| Ratio C/P | 1.5 | 2 | 1.5 | 1.5 | | 2 | |
| Pyridine A/P | 2 | 2 | 3 | | | | |
| Quinoline A/P | | | | 3 | | 3 | |
| COMPOSITION AFTER DILUTION: | | | | | | | |
| [PPD-T], % | 5 | | 6 | ≈4 | | 4 | |
| Ratio C/P | 1.95 | | 1.84 | 2 | | 2 | |
| Ratio A/P | 2 | | 3 | 3 | | 3 | |
| IV of the polymer | 4.55 | 4.20 | 2.95 | 4.40 | | 2.95 | |
| SPINNING: | | | | A | B | A | B |
| Extrusion temperature, °C. | 20 | 18 | 12 | 12 | 20 | 12 | 20 |
| Temperature of the bath, °C. | 20 | 18 | 16 | 16 | 16 | 16 | 16 |
| Speed of the yarn in m/minute | 7 | 10 | 8 | 13 | 13 | 14 | 14 |
| Spinneret stretching | 1.10 | 0.95 | 1.23 | 1.28 | 1.19 | 1.24 | 1.24 |
| Gauge per filament in dtex | 1.04 | 1.93 | 1.62 | 0.99 | 1.07 | 0.94 | 1.14 |
| Tensile strength, cN/tex | 36 | 29.7 | 24 | 21 | 18 | 22.5 | 16.4 |
| Elongation, % | 15.5 | 8.3 | 4.6 | 3.6 | 4.1 | 4.8 | 6.0 |

TABLE I-continued

| Example | 4 | 5 | 6 | 7 | 8 | | |
|---|---|---|---|---|---|---|---|
| Modulus, cN/tex | 1,660 | 880 | 910 | 1,200 | 880 | 990 | 420 |

Mechanical properties of the yarns can be increased by a stretching or heat treatment.

TABLE II

| Example | 9 | 10 | 11 | 12 | 13 | 14 |
|---|---|---|---|---|---|---|
| Water in diamine solution, in ppm | 127 | 612 | 127 | 206 | 241 | 247 |
| Addition time of the T-COCl | 45 minutes | 45 minutes | 30 seconds | 20 minutes | 73 minutes | 53 minutes |
| Temperature of mixture, °C. | 20–25 | 20–25 | 20–25 | 20–25 | 20–25 | 20–25 |
| Deviation from stoichiometry | −5.60 | −5.0 | −5.00 | −2.90 | −2.30 | −1.70 |
| PPD introduced, in mols | 0.28 | 0.28 | 0.28 | 0.28 | 6 | 6 |
| COMPOSITION | | | | | | |
| [PPD-T], % after polycondensation | 5.9 | 5.9 | 5.9 | 6 | 6 | 6.15 |
| [PPD-T], % after dilution | 5 | 5 | 5 | 6 | 6 | 6.15 |
| C/P | 2 | 2 | 2 | 2 | 1.77 | 1.77 |
| Pyridine A/P | | | | | | 2 |
| Quinoline A/P | 3 | 3 | 3 | 2 | 2 | |
| IV of the polymer | 3.40 | 2.70 | 3.30 | 3.50 | 3.65 | 3.95 |

The compositions obtained are all homogeneous and all exhibit anisotropy in the static state, under a microscope, in polarised light.

EXAMPLES 15 AND 16

A mixer of the type consisting of a mixing turbine and a stator, which are grooved and possess spikes, and having a capacity of 50 cm$^3$ is used, the turbine of which rotates at 5,500 rpm.

On the one hand molten terephthaloyl chloride kept at 100° C., and on the other hand a solution, at 13.8° C., of p-phenylenediamine in a mixture of NMP, CaCl$_2$ and pyridine in the following proportions:

| NMP | 101.53 g | containing 150 ppm of water |
|---|---|---|
| anhydrous CaCl$_2$ | 6.57 | |
| pyridine | 4.88 | containing 100 ppm of water | to which mixture 3.34 g of 99.9% pure PPD are added, are injected simultaneously and with high precision and uniformity.

The injection is carried out with a molar ratio T-COCl/PPD of 0.9955 in Example 15 and 1.0000 in Example 16.

Then, the material obtained in Example 15, leaving the mixer, passes through a twin-screw finishing apparatus comprising 11 kneading elements and rotating at 80 rpm. The apparatus is fitted with a jacket fed with water at 17° C. On the other hand, the material obtained in Example 16 is collected directly on leaving the mixture, without passing through the finisher.

Characteristics of the compositions obtained:

| Example | 15 | 16 |
|---|---|---|
| [PPD-T], % | 6 | 6 |
| Ratio C/P | 1.92 | 1.92 |
| Ratio A/P | 2 | 2 |
| IV of the polymer | 3.66 | 4.06 |

The compositions are fluid, homogeneous and anisotropic in the static state, under a microscope, in polarised light.

These examples show that it is possible to obtain a PPD-T having a good inherent viscosity by a continuous process which is extremely short since the residence time in the reactor is 2.28 seconds in the case of Example 16.

SPINNING

The compositions of Examples 9 to 16 were spun, after storage for 10 days in the absence of moisture, through a spinneret possessing 100 orifices of diameter 0.06 mm, into a water bath, but under different conditions of extrusion temperature, temperature of the coagulating bath, speed of the yarn on leaving the bath, and spinneret stretching.

Furthermore, compositions 13 and 14 were also spun under the same conditions, but after storage for three months in the absence of moisture, at ambient temperature (Examples 13' and 14').

The mechanical characteristics of the yarns obtained are given in Table III below.

They also can be increased by stretching or heat treatment.

TABLE III

| Example | | Extrusion temperature, °C. | Temperature of the bath, °C. | Speed of the filament, m/minute | Ss | Gauge per filament dtex | Tensile strength, cN/tex | A, % | Modulus, cN/tex |
|---|---|---|---|---|---|---|---|---|---|
| 9 | A | 22 | 15 | 12 | 1.22 | 1.41 | 18 | 4.5 | 570 |
| 9 | B | 9 | 9 | 9.5 | 1.00 | 1.40 | 28 | 4.2 | 1,260 |
| 10 | A | 23 | 18 | 13 | 1.35 | 1.14 | 35 | 3.2 | 2,450 |
| 10 | B | 9 | 14 | 14 | 1.44 | 0.95 | 31 | 2.8 | 2,080 |

TABLE III-continued

| Example | | Extrusion temperature, °C. | Temperature of the bath, °C. | Speed of the filament, m/minute | Ss | Gauge per filament dtex | Tensile strength, A, % cN/tex | | Modulus, cN/tex |
|---|---|---|---|---|---|---|---|---|---|
| 11 | A | 22 | 15 | 12 | 1.24 | 1.23 | 24 | 3.0 | 1,070 |
| 11 | B | 9 | 9 | 10 | 1.10 | 1.26 | 29 | 3.5 | 1,500 |
| 12 | A | 22 | 15 | 13 | 0.70 | 2.85 | 27 | 14.7 | 700 |
| 12 | B | 9 | 10 | 9.5 | 0.52 | 3.40 | 20 | 21.0 | 540 |
| 13 | A | 20 | 7 | 8.7 | 0.84 | 2.09 | 25 | 5.0 | 830 |
| 13 | B | 20 | 22 | 11 | 1.12 | 1.45 | 26 | 4.0 | 1,090 |
| 13 | C | 20 | 35 | 10 | 1.10 | 1.47 | 27 | 3.8 | 1,370 |
| 14 | A | 20 | 4 | 10 | 0.93 | 1.75 | 35 | 6.2 | 1,080 |
| 14 | B | 20 | 20 | 9.5 | 0.90 | 2.02 | 37 | 7.2 | 910 |
| 14 | C | 20 | 35 | 10 | 0.96 | 2.13 | 30 | 8.8 | 940 |
| 15 | A | 20 | 4 | 8 | 0.80 | 2.04 | 68 | 5.1 | 2,190 |
| 15 | B | 20 | 35 | 9 | 1.02 | 1.76 | 49 | 5.7 | 1,670 |
| 15 | C | 20 | 35 | 18 | 2.32 | 0.90 | 51 | 3.7 | 2,320 |
| 15 | D | 20 | 20 | 9 | 1.49 | 1.34 | 59 | 3.6 | 2,700 |
| 15 | E | 20 | 20 | 13 | 1.51 | 1.08 | 66 | 4.4 | 2,630 |
| 16 | A | 20 | 20 | 15 | 1.49 | 1.29 | 45 | 6.4 | 1,710 |
| 16 | B | 20 | 4 | 9 | 0.93 | 2.17 | 35 | 6.0 | 1,380 |
| 13' | A | 20 | 7 | 9 | 0.90 | 2.03 | 28.2 | 4.3 | 1,360 |
| 13' | B | 20 | 22 | 12.5 | 1.24 | 1.30 | 31.2 | 2.7 | 2,310 |
| 13' | C | 20 | 35 | 18.0 | 1.75 | 1.01 | 29.8 | 3.3 | 1,910 |
| 14' | A | 20 | 7 | 10 | 0.95 | 2.0 | 44 | 5.4 | 1,820 |
| 14' | B | 20 | 22 | 17 | 1.60 | 1.25 | 46 | 4.4 | 2,360 |
| 14' | C | 20 | 35 | 23.5 | 2.25 | 0.94 | 53 | 3.9 | 2,820 |

EXAMPLES 17 TO 20

The reaction is carried out as in Example 2, with pyridine.

After polycondensation, pyridine is added to the composition of Example 17, whereas the composition of Example 19 is diluted with a solution of $CaCl_2$ in NMP.

The operating conditions and the results are indicated in Table IV below:

TABLE IV

| Example | 17 | 18 | 19 | 20 |
|---|---|---|---|---|
| Water in diamine solution, in ppm | 150 | 164 | 278 | 218 |
| Addition time of T-COCl | 30 minutes | 60 minutes | 180 minutes | 19 minutes |
| Temperature of mixture, °C. | 20–25 | 20–25 | 20–25 | 0–5 |
| Deviation from stoichiometry | −2.35 | −2.70 | −5.45 | +0.6 |
| COMPOSITION AFTER POLYCONDENSATION: | | | | |
| [PPD-T], % | 6.13 | 6.21 | 9.92 | 5 |
| Ratio C/P | 0.75 | 0.75 | 1 | 2 |
| Ratio A/P | 1 | 3 | 1 | 2 |
| COMPOSITION AFTER DILUTION: | | | | |
| [PPD-T], % | | | 6 | |
| Ratio C/P | | | 2 | |
| Ratio A/P | 2 | | 1 | |
| IV of the polymer | 3.00 | 3.20 | 2.55 | 4.80 |

All the compositions obtained are fluid, homogeneous and anisotropic in the static state, under a microscope, in polarised light. They are spinnable.

EXAMPLES 21 TO 25

(comparison)

Example 2 is repeated again, with pyridine. The operating conditions and the results are indicated in Table V below.

TABLE V

| Example | 21 | 22 | 23 | 24 | 25 |
|---|---|---|---|---|---|
| Water in diamine solution, in ppm | 133 | | | 298 | |
| Addition time of T-COCl | 30 minutes | 30 seconds | 30 seconds | 30 seconds | 30 seconds |
| Temperature of mixture, °C. | 20–25 | 0–30 | 0–30 | 0–30 | 0–30 |
| Deviation from stoichiometry | −6.5 | +0.6 | +0.6 | +0.6 | +0.6 |
| COMPOSITION AFTER POLYCONDENSATION: | | | | | |
| [PPD-T], % | 6.18 | 8.45 | 8 | 7 | 9 |
| Ratio C/P | 0.5 | 1.5 | 1.5 | 1.5 | 2 |
| Ratio A/P | 2 | 0 | 1 | 4 | 3.24 |
| IV of the polymer | 3.75 | 4.80 | 5.28 | | 1.01 |

All the compositions obtained are heterogeneous and frequently have the appearance of semolina.

The addition of pyridine or NMP, by itself or with $CaCl_2$, does not make it possible to render them homogeneous.

They cannot be spun directly.

These examples show:
that an excessively low ratio C/P is not suitable (Example 21 compared with Example 14),
that the absence of tertiary amine is not suitable (Example 22 to be compared with Example 2),
that a high ratio C/P, combined with a polymer concentration which is also high, can lead to a heterogeneous mixture which can no longer be rendered homogeneous, especially if the T-COCl is added all at once (Example 23 to be compared with Example 19), and
that an excessively high ratio A/P is not suitable (Examples 24–25).

EXAMPLES 26 TO 30

The reaction is carried out as in Example 2, but with different tertiary amines.

The operating conditions and the results are indicated in Table VI below.

TABLE VI

| Example | 26 | 27 | 28 | 29 | 30 |
|---|---|---|---|---|---|
| Water in diamine solution, in ppm | 255 | 272 | 259 | 276 | 128 |
| Addition time of T-COCl | ≈180 minutes | ≈60 minutes | 80 minutes | 120 minutes | 29 minutes |
| Temperature of mixtyure, °C. | 20-25 | 20-25 | 20-25 | 20-25 | 0-5 |
| Deviation from −1.73 stoichiometry | −1.50 | −6 | −1.8 | −0.42 | |
| Tertiary amine | N,N—Dimethyl-aniline | Isoquinoline | 2-Methyl-pyridine | N,N—Diethyl-aniline | Quinoline |
| pK H$_2$O | 5.15 | 5.40 | 6.00 | 6.60 | 4.9-5.0 |
| COMPOSITION AFTER POLYCONDENSATION: | | | | | |
| ]PPD-T], % | 6.024 | 6 | 6.11 | 5.94 | 5.80 |
| Ratio C/P | 1.77 | 1.77 | 1.77 | 1.77 | 1.78 |
| Ratio A/P | 2 | 2 | 2 | 2 | 2 |
| IV of the polymer | 4.00 | 3.75 | 4.00 | 4.50 | 5.45 |

Only the composition obtained in Example 30, which is homogeneous but very viscous, was diluted with a solution of calcium chloride in NMP until a ratio C/P of 2 and a polymer concentration of 5.33% were obtained.

All the compositions obtained are fluid, homogeneous and anisotropic in the static state, under a microscope, in polarised light. They are spinnable.

EXAMPLES 31 TO 33

(comparison)

The reaction is carried out as in Example 2, with different amines having a pK H$_2$O of more than 6.60.

The operating conditions and the results are indicated in Table VII below.

The compositions obtained are all heterogeneous and cannot be spun.

TABLE VII

| Example | 31 | 32 | 33 |
|---|---|---|---|
| Water in diamine solution, in ppm | 255 | 261 | 256 |
| Tertiary amine | 2,4,6-Trimethyl-pyridine | 2,6-Dimethyl-pyridine | Triethyl-amine |
| pK H$_2$O | 7.40 | 7 | 11.00 |
| COMPOSITION AFTER POLYCONDENSATION: | | | |
| [PPD-T], % | 6.024 | 6.067 | 6.085 |
| Ratio C/P | 1.77 | 1.77 | 1.77 |
| Ratio A/P | 2 | 2 | 2 |

EXAMPLES 34 TO 37

The reaction is carried out as in Example 2, but with lithium chloride. The results obtained are indicated in Table VIII below.

TABLE VIII

| Example | 34 | 35 | 36 | 37 |
|---|---|---|---|---|
| Temperature of mixture, °C. | 0-5 | 0-5 | 0-5 | 0-5 |
| Deviation from stoichiometry | −4 | −3.4 | −2.2 | −4 |
| Tertiary amine | Pyridine | Pyridine | Pyridine | N,N—Di-methylaniline |
| COMPOSITION AFTER POLYCONDENSATION: | | | | |
| [PPD-T], % | 5 | 5 | 5 | 5 |
| Ratio C/P | 1.5 | 1 | 0.75 | 1 |
| Ratio A/P | 2.5 | 2 | 2 | 2 |
| IV of the polymer | 2.45 | 2.90 | 5.05 | |

The compositions obtained are all fluid, homogeneous and anisotropic in the static state, under a microscope, in polarised light. They are stable for one to several hours in the absence of moisture, at low temperature or at ambient temperature. They are spinnable.

What is claimed is:

1. A process for the production of a homogeneous, anisotropic, fluid composition that as produced can be directly shaped, in which process a substantially stoichiometric amount of substantially pure terephthaloyl chloride is reacted with a solution of substantially pure para-phenylenediamine in an amount such as to form a polymer composition containing at least 5% by weight of para-phenyleneterephthalamide, in a homogeneous mixture of N-methyl-pyrrolidone and calcium chloride or lithium chloride, and a tertiary amine with a pK H$_2$O equal to at most 6.60, the molar ratio of calcium chloride or lithium chloride to the para-phenylenediamine being 0.75 to 2 in the case of the calcium chloride or lithium chloride and 1 to 3 in the case of the tertiary amine, without however exceeding the solubility limit of the calcium chloride or lithium chloride, and a further amount of the same tertiary amine and/or of N-methylpyrrolidone-2, which may contain calcium chloride or lithium chloride, is added, so that the final shapable composition contains 5 to 7% by weight of poly-para-phenyleneterephthalamide and at the same time 0.75 to 2 mols of calcium chloride or lithium chloride and 2 to 3 mols of tertiary amine per para-phenyleneterephthalamide unit.

2. A process according to claim 1, in which the tertiary amine is pyridine.

3. A process according to claim 1, in which the tertiary amine is selected from the class consisting of quinoline, isoquinoline, methylpyridine, dimethylaniline and diethylaniline.

4. A process according to claim 1, in which the reaction of the terephthaloyl chloride with the para-phenylenediamine solution is carried out continuously.

5. A process according to claim 1, in which the reaction of the terephthaloyl chloride with the para-phenylenediamine solution is carried out batchwise with controlled addition of the terephthaloyl chloride.

6. A simplified process for the production of filaments, fibers, films or fibrids of substantially pure poly-paraphenyleneterephthalamide, having good mechanical properties, by extrusion or casting of a composition as defined in claim 1, at a temperature which is below 25° C., into a water-based coagulating bath at a temperature which is below 35° C., washing with water, drying in air, and eventually stretching and/or heat treating.

7. A yarn, a fiber, a film or a fibrid, when obtained by the process according to claim 6.

* * * * *